United States Patent [19]
Dick

[11] 3,922,797
[45] Dec. 2, 1975

[54] METHOD FOR COOLING HOT PARTICULATE MATERIAL
[75] Inventor: Charles J. Dick, Bethlehem, Pa.
[73] Assignee: Fuller Company, Catasauqua, Pa.
[22] Filed: July 18, 1974
[21] Appl. No.: 489,689

Related U.S. Application Data
[62] Division of Ser. No. 327,967, Jan. 30, 1973, Pat. No. 3,839,803.

[52] U.S. Cl. .................. 34/20; 432/78; 432/80; 432/85
[51] Int. Cl.² ............... F26B 7/00; F27D 15/02
[58] Field of Search ............... 34/20; 432/78, 80, 85

[56] References Cited
UNITED STATES PATENTS

| | | | |
|---|---|---|---|
| 1,844,782 | 2/1932 | Mittag | 34/20 |
| 1,979,602 | 11/1934 | Bojner | 34/20 X |
| 2,367,063 | 1/1945 | Shallock | 432/85 X |
| 3,686,773 | 8/1972 | Schreiner | 34/203 |

Primary Examiner—John J. Camby
Attorney, Agent, or Firm—Frank H. Thomson

[57] ABSTRACT
A method and apparatus for cooling hot particulate material such as cement clinker discharged from a furnace, such as a rotary kiln. A first heat exchanger of the type wherein cooling gas is passed upwardly through the material to cool the material and this gas is heated by the hot material and supplied to the kiln as preheated combustion air. The first heat exchanger is followed by a clinker breaker and a second heat exchanger which includes an arrangement for spraying the hot material with water. The spray cooler is followed by a third heat exchanger of the type wherein cooling air is passed upwardly through the material in direct contact with the material. The cooling air which flows through the third heat exchanger flows directly through the first heat exchanger. A material seal is provided between the second and third heat exchangers to prevent cooling air from passing through the second heat exchanger. A vent from the second heat exchanger is provided to exhaust steam produced when the water contacts the hot material. A control may be provided so that the amount of water sprayed onto the hot material at the second heat exchanger is responsive to the temperature of the material discharged from the third heat exchanger. As a modification, ambient air may be supplied directly to the hottest material discharged from the kiln for passage through the first heat exchanger.

6 Claims, 2 Drawing Figures

METHOD FOR COOLING HOT PARTICULATE MATERIAL

This is a division of application Ser. No. 327,967, filed Jan. 30, 1973 now U.S. Pat. No. 3,839,803.

BACKGROUND OF THE INVENTION

This invention relates to material coolers and in particular to recuperative type heat exhangers wherein cooling air is passed through the hot material to cool the material and the cooling air which is heated by the hot material is supplied to a furnace for use as preheated combustion air. More particularly, the invention provides a heat recuperative type material cooler which substantially eliminates the need for dust collection equipment.

Heat recuperative type material coolers such as that used for cooling cement clinker discharged from a rotary kiln are generally known and can be illustrated by apparatus such as that shown in U.S. Pat. Nos. 2,137,158 and 2,846,778. In this type of apparatus, material is discharged from the furnace onto a conveyor, such as a reciprocating grate conveyor, which advances the material through the cooler. Cooling air is blown upwardly through the bed of material and cools the material, as the material is cooled. The air is heated by the hot material and returned to the furnace or rotary kiln as combustion air. The apparatus has as its primary advantage the ability to reduce fuel consumption by the furnace by using preheated combustion air.

A disadvantage of the reciprocating grate type material cooler is that in order to reduce the temperature of the material to a level which can be conveniently handled, it is necessary to pass more cooling air through the hot material than can be used by the furnace. For example, in a cement making process, the cement clinker will be cooled from a temperature of about 2500°F to 150°F. In order to achieve all of this cooling by direct heat exchange with air, about three times as much air is needed for cooling as can be used in the burning of cement clinker. The two-thirds which cannot be used by the kiln must be vented to atmosphere. As the cooling air passes through the bed of cement clinker, it will pick up dust and fine particles of cement clinker. These fine particles of cement clinker are a valuable product which should be collected by passing the excess air through a high efficiency dust collector. Such dust collectors add to the expense of the material cooling system and a reduction in their size or their elimination would be advantageous.

Various attempts have been made to overcome the problem of venting these large amounts of air to atmosphere in an effort to eliminate the necessity of using an expensive high efficiency dust collector. Some of these attempts are illustrated by U.S. Pat. Nos. 3,667,133 and 3,704,525 wherein the excess cooling air is passed through a heat exchanger and then recirculated to the material cooler. However, it has been found that these arrangements are not acceptable for many applications particularly where a large volume of particulate material must be cooled. Other attempts have been made to overcome the venting problem by following a direct heat exchanger with an indirect heat exchanger with the direct heat exchanger only used for heat recuperation purposes. These attempts are illustrated by U.S. Pat. Nos. 3,705,460 and 3,705,620. Although these material coolers work satisfactory, it is not believed that they are a satisfactory solution for applications where a large volume of material is to be cooled.

Attempts have been made to reduce the amount of air which is required for cooling the hot material by using a liquid to cool either the material discharged from the recuperation zone of the cooler or the cooling gas discharged from a portion of the gas heat exchanger and then supplying this same gas to cool the hottest material in the cooler. Prior arrangements wherein the hot material is cooled directly by liquid after it is discharged from the recuperation zone of the cooler have the disadvantage that a wet product is produced. This requires that the product be dried by some other means before it can be processed further. In a cement plant, this necessitates that the material first be dried before it can be supplied to a grinding mill for finish grinding.

Attempts have been made to cool the air discharged from the cooler zones of the gas heat exchanger and then recirculating such cooled air to the hotter zones of the gas heat exchanger. This arrangement is illustrated by U.S. Pat. No. 3,686,773. However, this apparatus has not proved altogether satisfactory because it does not achieve a completely ventless cooler. Another attempt to cool material with liquid is illustrated in U.S. Pat. No. 3,162,431. In this apparatus, water is sprayed onto the material to be cooled, but primarily for use in improving the efficiency of the dust collection system, namely, the electrostatic precipitator. In addition, this apparatus has the disadvantage that moistened laden air will be conveyed to the furnace and reduce the efficiency of the apparatus.

By the present invention, a cooler has been provided which is capable of cooling hot material such as cement clinker discharged from a rotary kiln by the use of gas such as air passing through the hot material to maintain the advantages of the recuperation type heat exchanger. Substantially all of the air is returned to the furnace as preheated combustion air. However, it is believed that the need for a high efficiency dust collection system has been substantially eliminated. This is achieved by providing a heat exchanger which sprays water onto the hot material and substantially preventing cooling air passing through the gas heat exchanger from entering the liquid heat exchanger.

SUMMARY

It is the principal object of this invention to provide a method and apparatus for cooling hot particulate materials which retains the advantages of prior material coolers while eliminating their primary disadvantage.

It is another object of this invention to provide a method and apparatus for cooling hot particulate material which permits heat recuperation but substantially eliminates the need for a high efficiency dust collector system.

It is a still further object of this invention to provide an apparatus for cooling hot particulate material which eliminates the need for a high efficiency dust collector yet is capable of discharging a product cooled to the desired extent.

In general, the foregoing and other objects will be carried out by providing apparatus for cooling hot particulate material discharged from a furnace and for supplying preheated combustion air to said furnace comprising a first heat exchanger including means for supporting the material to be cooled and advancing material through the heat exchanger; conduit means for conducting material to be cooled from said furnace to said first heat exchanger; a second heat exchanger flow connected with said first heat exchanger for receiving material from said first heat exchanger and including means for supplying a cooling liquid for direct contact with the material to be cooled; a third heat exchanger flow connected with said second heat exchanger for receiving material from said first heat exchanger and including means for supporting the material to be cooled and advancing the material through the heat exchanger; means for supplying cooling air to said third heat exchanger for sequential passage through the material in said third and first heat exchangers whereby cooling air passes through the coolest material first and the hottest material last and is heated by said material; means for conducting said heated air to said furnace; and breaker means positioned between two of said heat exchangers. The objects will also be carried out by the method of cooling hot particulate material comprising the steps of passing a cooling gas through the material to be cooled; further cooling said material by directly contacting said material with a liquid while substantially preventing the passage of a cooling gas therethrough; and passing a cooling gas through said material.

BRIEF DESCRIPTION OF THE DRAWINGS

The invention will be described in connection with the annexed drawings wherein.

DESCRIPTION OF THE PREFERRED EMBODIMENT

Figure 1:
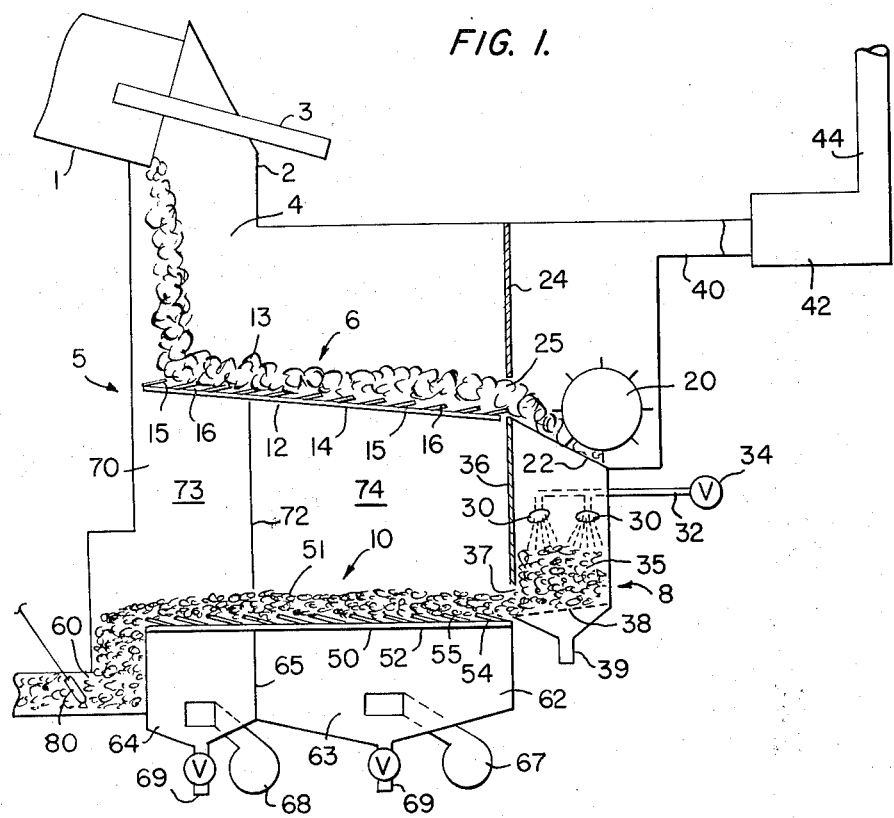
FIG. 1 is a diagrammatic view of one embodiment of the present invention.
Figure 2:
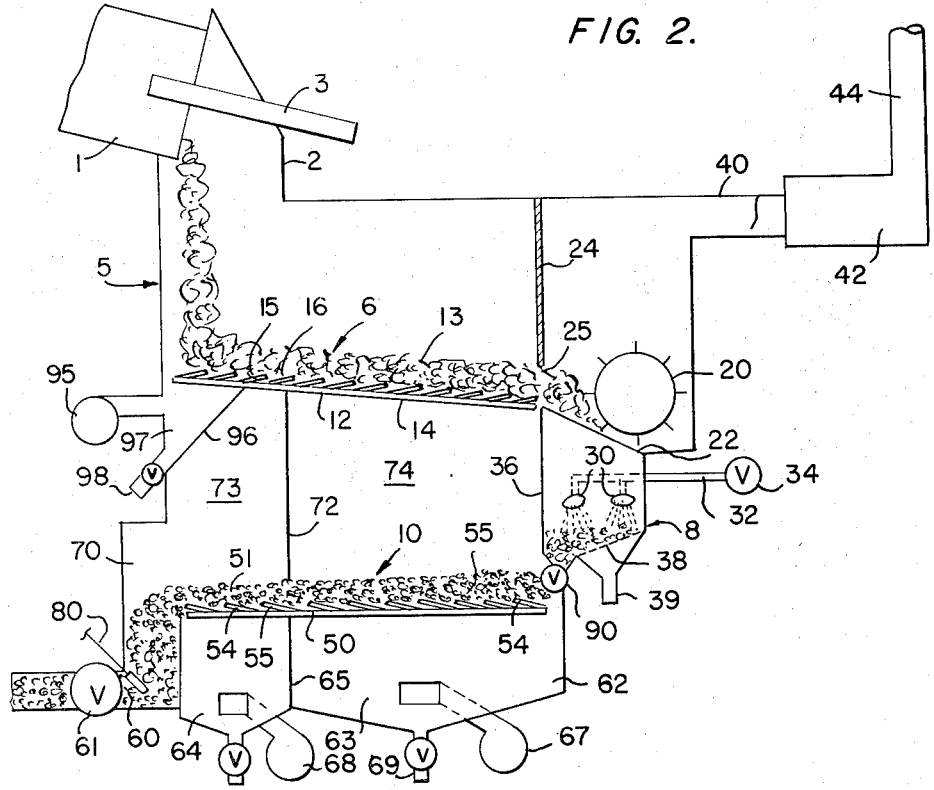
FIG. 2 is a diagrammatic view showing a modification of the present invention.

The embodiment shown in FIGS. 1 and 2 are substantially the same and like parts will be designated by like numerals.

Referring to FIG. 1, there is shown a furnace such as a rotary kiln 1 which discharges hot material to be cooled into the cooling apparatus generally indicated at 5. A conduit 2 connects kiln 1 to the inlet 4 of the cooling apparatus 5 and serves to conduct hot material from the kiln 1 to the cooler 5 and return preheated combustion air from the cooler 5 to the kiln 1. A fuel supply pipe 3 is provided and may have a suitable burner nozzle (not shown) attached to the end inside the kiln 1.

The cooling apparatus 5 includes a first gas heat exchanger generally indicated at 6, a second liquid heat exchanger generally indicated at 8 and a third gas heat exchanger generally indicated at 10. The first heat exchanger 6 is illustrated as being of the inclined grate type but may be horizontal and includes a reciprocating grate conveyor 12 for supporting a bed of material 13 in the heat exchanger and advancing the material from the inlet 4 of the cooling apparatus 5 to the second heat exchanger 8. The conveyor 12 includes a frame 14 and alternating rows of fixed grates 15 and movable grates 16, each having a plurality of openings therein. In a manner well known in the art, means (not shown) are provided for reciprocating the frame 14 to which are secured the movable grates 16 and the reciprocation of the frame 14 and grates 16 causes an advancement of material through the heat exchanger 6. Gaseous fluid such as air is supplied, in a manner hereinafter described, to a plenum below the conveyor for passage through the conveyor and the bed of material 13 to thereby cool the material.

A material breaker 20 is provided at the discharge of the heat exchanger 6 for reducing the size of large particles of material. A grizzly 22 allows the passage of small particles of material into the second heat exchanger 8 and the breaker 20 reduces the size of the large particles to permit their passage to the grizzly 22.

A partition 24 aids in the breaking of large particles of material by the action of the breaker 20 throwing these large particles against the partition wall 24. The partition 24 extends down towards the bed of material 13 a distance sufficient so that the depth of the bed of material 13 provides a material seal at the outlet 25 of the heat exchanger 6 between the heat exchanger 8 and the heat exchanger 6.

The second heat exchanger 8 includes means for supplying liquid for direct contact with the material to be cooled. In the preferred embodiment, this means includes a pair of shower heads 30 supplied with water through a conduit 32 from a suitable source (not shown). A valve 34 serves to regulate the amount of water sprayed by the shower heads 30 onto the bed material 35. The heat exchanger 8 includes a partition wall 36 which extends down towards the material outlet 37 of the heat exchanger 8. The heat exchanger 8 may include a permeable bottom 38 which permits excess water to be drained from the material to a discharge 39. If desired, rather than relying on the natural flow of material to achieve discharge of material from heat exchanger 8, the partition 38 may include a reciprocating grate conveyor or some other pusher means for advancing material from the heat exchanger 8 through the material outlet 37 towards the third heat exchanger 10. The bed of material 35 is maintained at a depth sufficient to cover the outlet 37 formed by the partition 36 and form a material seal between the third heat exchanger 10 and the second heat exchanger 8.

When the water contacts the bed of material 35, steam will be formed and this steam passes up through the grizzly 22 to a discharge or exhaust conduit 40 which leads to a condenser means 42. From the condenser means 42, a stack 44 may be provided for exhaust to atmosphere. Because of the material seal formed by the bed of material 13 and partition 24, and the fact that gases follow the easiest flow path which will be through the condenser 42, very little, if any, of this steam will be conducted to the heat exchanger 6. Substantially no cooling gas is passed through the heat exchanger 8 and therefore very little, if any, dust will be picked up by the gas being exhausted from the heat exchanger 8 through the conduit 40. This is important because it eliminates the necessity of a high efficiency dust collector on the stack 44. It is possible that some particulates will be picked up by the rising vapor, but these will be of such limited amount that they will drop out in the area around the breaker 20 or picked up in the condenser 42 or a suitable dropout box. In addition, it is possible that some cooling air will flow through the outlet 37 into the heat exchanger 8, but it is believed that this will not entrain a substantial amount of dust.

The heat exchanger 10 is substantially the same as the heat exchanger 6, but the reciprocating grate conveyor 50 which supports a bed of material 51 in the heat exchanger 10 is horizontal rather than inclined. If desired, the conveyor 50 may be inclined rather than horizontal. The conveyor 50 includes a frame 52 and a plurality of alternate rows of fixed grates 54 and movable grates 55 each having passages therethrough. Means (not shown) are provided for reciprocating the frame 52 and the movable grates 55 in a well-known manner to advance material from the outlet 37 of the heat exchanger 8 to the discharge 60 of the cooling apparatus 5. A plenum chamber 62 is provided under the conveyor 50 and may be divided into chambers 63 and 64, respectively, for supplying cooling gas to the plenum chamber 62 for passage upwardly through the conveyor 50 and the bed of material 51 supported on the conveyor. The cooling gas passes through the material 51 to cool the material and such cooling gas is heated by the material. The area above the heat exchanger 10 and below the conveyor 12 of the heat exchanger 6 forms a plenum chamber 70 for the heat exchanger 6. The chamber 70 may be divided by suitable partitions such as 72 to provide chambers 73 and 74. After passing through the bed of material 51, the cooling gas is further heated by the hot bed of material 13 and returned as preheated combustion air to the kiln 1 through the conduit 2. The material seal formed at the outlet 37 of the second heat exchanger substantially prevents the cooling air from short circuiting through the liquid heat exchanger 8.

The partition 72 is approximately aligned with the partition 65. Since the coolest material will be near the end of the third heat exchanger 10, the gas in chamber 73 will be cool and achieve the best heat exchange with the hottest material in the apparatus 5 which is at the beginning of the first heat exchanger 6.

Because of the openings in the grates 15, 16, 54 and 55, some of the particulate material will fall through the grate conveyors 12 and 50. That material which falls through the grate 12 will fall onto the bed of material 51. That material which falls through conveyor 50 will drop into chambers 63 and 64 and may be discharged therefrom from suitable valved outlets 69 onto a suitable conveyor (not shown).

An important feature of the present invention is that the amount of water sprayed onto the material in the heat exchanger 8 be sufficient to cool the material a substantial amount, but not so great as to result in a wet product being discharged from outlet 60 of the apparatus 5. The material discharged from the heat exchanger 8 should retain sufficient heat to dry the material when combined with the passage of cooling gas through the material. Preferably, a temperature sensor 80 is provided in the discharge 60 and this temperature is used to control valve 34 and the amount of water sprayed onto the hot material.

From the foregoing, it should be apparent that the cooler of the present invention provides the advantage that all gas blown through the material to cool the material is returned to the kiln 1 as preheated combustion air thereby maintaining the advantage of prior recuperative type heat exchangers. The cooler of the present invention also provides that substantially no cooling gas is exhausted to atmosphere thereby eliminating the need for a high efficiency dust collector.

The embodiment of FIG. 2 is substantially the same as that shown in FIG. 1 but has the addition of a valve means 90 between the heat exchanger 8 and the heat exchanger 10. In this embodiment, the valve means 90 replaces the material seal formed at the outlet 37 by the partition 36 and serves to insure that cooling gas will not be short-circuited through the heat exchanger 8 to the outlet 40.

As an additional modification, a valve 61 may be added to the cool material outlet 60. This will insure that a material seal is formed at this outlet to prevent cooling air which passes through the third heat exchanger 10 from being short-circuited through the outlet 60 and not passing through heat exchanger 6.

Also in the embodiment of FIG. 2, a fan 95 has been provided for supplying ambient cooling gas to the initial portion of the first heat exchanger 6. A partition 96 is provided in the chamber 73 to provide a chamber 97 to direct this ambient cooling air to the first rows of grates 15 and 16 to insure that the hottest material is quenched with cool air. This insures that the grates 15 and 16 will be longer lasting and achieve a better air quench of the hot material. The chamber 97 is provided with a valved outlet 98 for discharging any material which may fall through the grates above chamber 97. This material may be conveyed to the material outlet 60.

The amount of air and water required to cool material can best be illustrated by an example. A quantity of 5300 barrels per day of cement clinker discharged from a kiln and supplied to the first heat exchanger 6 may be at a temperature of 2500°F. The material discharged from the first heat exchanger 6 is at 1170°F. Water may be supplied to the showers 30 at the rate of 29 gpm and the material discharged from the second heat exchanger 8 at 280°F. The fan 67 supplies 12,300 scfm at 90°F and the fan 68 supplies 5800 scfm at 90°F. The average temperature in the chamber 70 is 200°F and material is discharged from the cooler 5 at approximately 150°F. The steam vent 40 has approximately 6500 cfm discharged therethrough. The air returned to the kiln 1 as preheated combustion air will be at approximately 1600°F.

The apparatus may be modified by putting a floor between the gas heat exchangers 6 and 10 and passing the gas from the heat exchanger 10 through fans before it is supplied to a plenum below the conveyor 12. If desired, a walkway may be provided below the conveyors 12 and 50 to permit servicing. For certain applications, it may be desirable to add cooling air to heat exchanger 8, but this should not be air in an amount sufficient to entrain large quantities of dust. This could occur where a small amount of cooling air is added below the heat exchanger 8 to insure that any means provided for moving the material through the outlet 37 is not damaged by constant exposure to hot material. The apparatus could also be modified by extending the heat exchanger 10 out from heat exchanger 8 in line with heat exchanger 6 rather than under heat exchanger 6 in the double deck manner shown in the drawing. This arrangement may be employed where head room would not permit the double deck arrangement.

From the foregoing, the method of cooling hot particulate material according to the present invention should be apparent. The material is cooled by first passing a cooling gas through the hot material, then further cooling is achieved by directly contacting the material with a liquid while substantially preventing the passage of cooling air through the material, and subsequently cooling the material by passing a cooling gas through the material. Substantially all of the spent cooling gas is returned to the furnace as preheated gas. The vapor formed by the direct contact of the material with a liquid is exhausted through an outlet independent of the conduit which returns preheated gas to the furnace.

From the foregoing, it should be apparent that the objects of this invention have been carried out. A cooler has been provided which eliminates the necessity of a high efficiency dust collector while retaining the recuperating advantages of prior gas type material coolers and particularly the recirculating type material coolers.

It is intended that the foregoing description be merely that of a preferred embodiment and that the invention be limited solely by that which is within the scope of the appended claims.

I claim:

1. The method of cooling hot particulate material such as cement clinker discharged from a furnace such as a rotary kiln and supplying preheated gas to the furnace comprising the steps of:
   passing a cooling gas through the material discharged from said furnace to cool the material and heat the gas;
   then, further cooling the material by directly contacting said material with a liquid;
   subsequently, passing a cooling gas through the material to further cool the material and heat the gas;
   returning substantially all of the heated gas which has passed through the material to the furnace as preheated gas; and
   exhausting vapor formed by directly contacting the material with a liquid separately from the heated gas returned to the furnace.

2. The method according to claim 1 further comprising the step of substantially preventing cooling gas from passing through said material while it is being directly contacted by a liquid.

3. The method according to claim 1 further comprising the step of sequentially passing cooling gas first through the material after the material is cooled by direct contact with liquid and then passing the same cooling gas through the material before the material is cooled by direct contact with liquid.

4. The method of cooling hot particulate material comprising the steps of:
   passing a cooling gas through the material to be cooled;
   further cooling said material by directly contacting said material with a liquid while substantially preventing the passage of a cooling gas therethrough; and
   passing a cooling gas through said material.

5. The method of cooling hot particulate material according to claim 4 further comprising the step of sequentially passing cooling gas first through the material after the material is cooled by direct contact with liquid and then passing the same cooling gas through the material before the material is cooled by direct contact with liquid.

6. The method of cooling hot particulate material according to claim 5 further comprising the step of passing ambient cooling gas through the material before it is directly contacted by a liquid.

* * * * *